Figure 1:
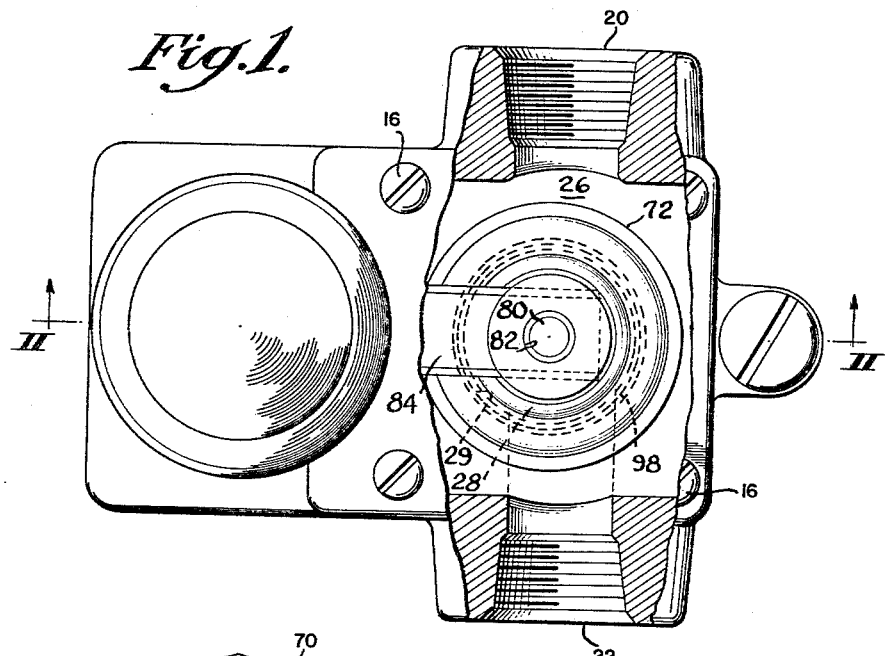

Sept. 4, 1962  M. M. GRAHAM ET AL  3,052,264
CONTROL VALVE
Filed Sept. 26, 1958

3,052,264
CONTROL VALVE
Marvin M. Graham, San Pedro, and John W. Wright, Long Beach, Calif., assignors to Robertshaw-Fulton Controls Company, Richmond, Va., a corporation of Delaware
Filed Sept. 26, 1958, Ser. No. 763,708
3 Claims. (Cl. 137—628)

This invention relates generally to thermostatic control valves and more particularly to combined snap-acting and throttling valves for regulating fluid flow to gas-fired heaters and the like in response to temperature changes in a space to be heated.

In the use of space heaters, it is desirable that the stratification of the air in the space to be heated be held to a minimum. This can be accomplished by throttling down the flow of fuel to a heater so as to slow down the room temperature rise and prolong the "burner-on" time thereby effecting a longer period of thermal convection.

It is well known to employ overcenter snap-acting mechanisms for controlling the movement of valve members. These overcenter snap-acting mechanisms have considerable preliminary graduating movement as the snap-acting means moves from one or the other of its snapped positions to the deadcenter position. In conventional snap-acting valves, this preliminary graduating movement has not been utilized to any considerable degree.

It is an object of this invention to utilize the preliminary graduating movement of a snap-acting means for effecting a throttling action of a control valve of the indicated type.

Another object of this invention is to regulate the flow of fuel to a space heater or the like so as to minimize the stratification of the air in the space to be heated.

Another object of this invention is to combine a snap-acting valve and a throttling valve in a unitary casing with a simple, compact and reliable structure permitting economy in manufacture and facilitating installation and repair.

In a preferred embodiment of the invention, a thermostat responsive to the temperature of a space to be controlled controls the movement of a snap-acting valve member through an overcenter snap-acting means. The snap-acting valve member is cooperable with a first valve seat intersecting a passageway through a control valve. By means of a lever connection, the thermostat also controls the movement of a throttle valve member which cooperates with a second valve seat. During temperature variations in the space to be controlled which are insufficient to cause the snap-action means to snap overcenter, the snap-acting means will maintain a snap-acting valve member in either an open or a closed position relative to the first valve seat while it is moved within its preliminary graduating movement in response to thermostat movement. However, this thermostat movement will be transmitted to the throttle valve member which will be moved relative to the second valve seat to throttle the control valve flow.

Figure 2:
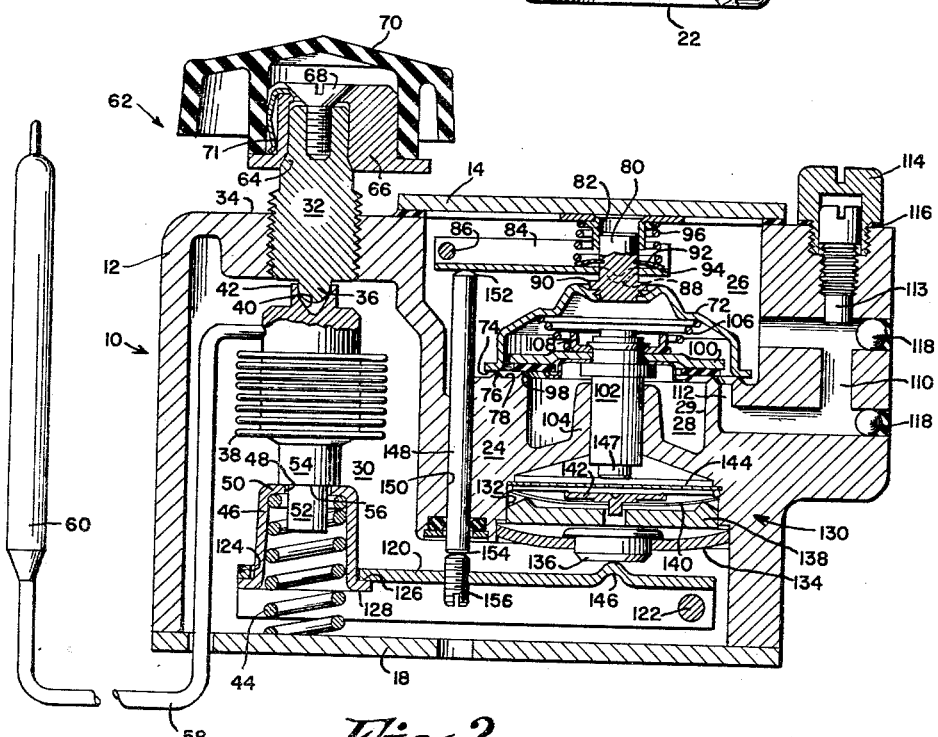

The above and other objects and features of the invention appear more fully from a consideration of the following description taken in connection with the accompanying drawings wherein:

FIG. 1 is a plan view of a preferred embodiment of the invention with a portion of the casing broken away; and FIG. 2 is a sectional view taken on line II—II of FIG. 1.

Referring now to FIGS. 1 and 2, the embodiment of the invention illustrated therein includes a casing 10 comprised of a valve body 12 having an upper access plate 14 secured thereto by bolts 16 and a lower access plate 18 secured thereto by a plurality of bolts (not shown). Valve body 12 defines an inlet 20 and an outlet 22 and has a partition 24 which defines an inlet chamber 26 communicating with inlet 20 and is annularly recessed to define an outlet chamber 28 communicating with outlet 22.

Partition 24 also cooperates with valve body 12 and plate 18 to define a control chamber 30. A temperature adjusting plug 32 is threadedly mounted in the top wall 34 of valve body 12 so that the bottom end 36 thereof extends into control chamber 30. An expansible and contractible bellows 38 having a recess 40 formed in its upper end 42 for reception of bottom end 36 of plug 32 is vertically mounted in control chamber 30. Bellows 38 is biased into engagement with plug 32 by means of a spring 44 mounted in compression between acess plate 18 and a spring retaining cup 46 having a central bore 48 in the base 50 thereof for reception of a reduced shaft member 52 extending downwardly from the bottom end 54 of bellows 38. Bellows 38 is supported on base 50 of retaining cup 46 at shoulder 56. Hence, cup 46 will be movable in accordance with the movement of bottom end 54 of bellows 38.

Bellows 38 contains a suitable thermally responsive fluid and connects, through a capillary tube 58, with a temperature sensing bulb 60 positioned in the space where the temperature is to be controlled. Since upper end 42 of bellows 38 is confined against movement by plug 32, bottom end 54 is movable in response to expansion and contraction of bellows 38 to thereby cause a corresponding movement of the cup 46.

A conventional dial and calibration means 62 is secured to the tapered upper end 64 of temperature adjusting plug 32 for rotating the same to desired temperature settings. As these dial and calibration means are well known in the art, a detailed discussion thereof is deemed unnecessary. For purposes of this description, suffice it to state that such means comprises a stop member 66 frictionally locked to tapered upper end 64 by a screw 68 and a conventional calibration dial 70 mounted on stop member 66 by means of a clip 71. It will be apparent that rotation of dial 70 will cause a corresponding rotation of temperature adjusting plug 32 which in turn causes vertical movement of bellows 38 and cup 46.

A generally cup-shaped throttle valve member 72 is mounted in an inverted position for movement in inlet chamber 26 so that an annular peripheral edge 74 thereof is engageable with a throttle valve seat 76 formed on an oppositely disposed face 78 on partition 24. Throttle valve member 72 is mounted on a valve stem 80 which is vertically slidable in a valve guide 82 secured to access plate 14. A throttle valve lever 84 is pivoted at one end on a pivot pin 86 secured to valve body 12 and is positioned to overlie valve stem 80 so that an upset 88 on the underside of the movable portion of lever 84 is engageable with a flange 90 formed on throttle valve stem 80. Valve stem 80 extends into valve guide 82 and has a spring washer 92 secured thereto. The peripheral edge 94 of spring washer 92 is biased to resiliently engage the upper side of the throttle valve lever 84 so as to retain upset 88 in engagement with flange 90. Valve stem 80 is thus slidable within valve guide 82 in accordance with pivotal movement of throttle valve lever 84. A coil spring 96 mounted in compression between access plate 14 and spring washer 92 biases throttle valve member 72 toward throttle valve seat 76.

A control valve seat 98 communicating with outlet chamber 28 is formed on the inner edge of face 78 on partition 24 within throttle valve seat 76 and in concentric relation thereto. An annular control valve member 100 is secured to a valve stem 102 which is mounted for axial movement in a valve guide 104 formed on partition 24 in axial alignment with valve guide 82 whereby control valve member 100 is movable into and out of engagement with control valve seat 98. Cup-shaped throttle valve member 72 is adapted to enclose control valve member 100 as it moves into and out of engagement with control valve seat 98. A coil spring 106 mounted in compression between throttle valve member 72 and control valve member 100 is operative to bias control valve member 100 toward control valve seat 98. Coil spring 106 is held in place by a spring retaining cup 108 mounted on control valve stem 102 adjacent control valve member 100.

In order to allow a flow of fluid from inlet chamber 26 to outlet chamber 28 when throttle valve seat 76 is covered by throttle valve member 72, an auxiliary passageway is provided. The auxiliary passageway is comprised of the passageway defined by control valve seat 98 and a bypass passageway 110 communicating at one end with inlet chamber 26 and at the other end with an L-shaped duct 112 formed in partition 24 between concentric valve seats 76 and 98.

The flow area of bypass passageway 110 is adjustable by means of an adjustable plug valve member 113 threadedly mounted in valve body 12 to project into bypass passageway 110 at one end thereof and to extend exteriorly of valve body 12 at the other end thereof. Any suitable means is provided for sealing valve member 113 as, for example, a sealing cup 114 and gasket 116, which are positioned about the exteriorly extending end of valve member 113. Ball seals 118, or other suitable means, are provided for sealing the bypass passageway 110.

A control means is provided for transmitting the movement of bellows 38 to control valve member 100 and throttle valve member 72. Such means takes the form of a control lever 120 mounted for pivotal movement in response to bellows movement and operative connections between control lever 120 and valve members 100 and 72. Control lever 120 is mounted at one end on a pivot pin 122 supported on valve body 12 and has a bore 124 at the movable end thereof for reception of cup 46. The underside of control lever 120 rests on the upper face 126 of an outwardly extending flange 128 on cup 46. It will thus be apparent that the movement of cup 46 in response to bellows movement will cause a corresponding pivotal movement of control lever 120.

The operative connection between control lever 120 and control valve member 100 comprises a conventional overcenter snap-action mechanism 130 operatively engageable between control lever 120 and control valve stem 102. Snap-action mechanism 130 is retained within a cylindrical recess 132 in partitions 24 in axial alignment with valve guide 104 by means of a pressed-in welch plug 134 and comprises a conventional thrust button 136 centrally mounted on welch plug 134, plunger 138, clicker 140, fulcrum button 142, and fulcrum levers 144. Control lever 120 is so positioned that an upwardly projecting upset dimple 146 between the ends thereof engages thrust button 136. As is well known, thrust button 136 is adapted to transmit the movement of control lever 120 to plunger 138 which actuates clicker 140 between an inactive and an active position through an overcenter position with a snap-action. This movement of clicker 140 transmits an amplified movement to fulcrum levers 144 by means of fulcrum button 142. Since fulcrum levers 144 are adapted to engage the bottom end 147 of control valve stem 102 which extends into recess 132, movement of clicker 140 through the operating positions thereof causes axial movement of control valve stem 102 in valve guide 104.

When clicker 140 is in the inactive position thereof, fulcrum levers 144 allow spring 106 to maintain control valve member 100 in engagement with control valve seat 98. This condition exists during the movement of clicker 140 from the relaxed position thereof through the preliminary graduating movement thereof to the overcenter position. However, when clicker 140 snaps overcenter to its active position, fulcrum levers 144 force valve stem 102 upwardly to thereby move control valve member 100 to an open position. This condition exists until clicker 140 is moved through the return overcenter position at which time fulcrum levers 144 will allow spring 106 to move control valve member 100 into engagement with control valve seat 98. It will thus be apparent that control valve member 100 is operable to move abruptly between alternate open and closed positions in response to operation of the overcenter snap-action mechanism 130.

The operative connection between control lever 120 and throttle valve 72 includes throttle valve lever 84 and an abutment shaft 148 slidably mounted in a bore 150 formed in partition 24 to extend between inlet chamber 26 and control chamber 30. The upper end 152 of abutment shaft 148 extends into inlet chamber 26 to engage throttle valve lever 84 intermediate the ends thereof. The lower end 154 of abutment shaft 148 extends into operating chamber 30 to engage an adjusting screw 156 threadedly mounted on control lever 120 at a point intermediate the ends thereof.

Throttle valve lever 82 is maintained in engagement with abutment shaft 148 by means of spring 96 whereby throttle valve lever 84 will pivot about pivot pin 86 in response to vertical movement of abutment shaft 148. Since abutment shaft 148 engages throttle valve lever 84 at a point adjacent the pivoted end thereof, the pivotal movement of control lever 120 at adjusting screw 156 will be transmitted into a corresponding amplified movement of the freely movable end of throttle valve lever 84.

Throttle valve member 72 cooperates with throttle valve seat 76 and face 78 to define a throttle flow passageway which communicates with control valve seat 98 to permit flow from inlet chamber 26 to outlet chamber 28. Since throttle valve member 72 is movable in response to pivotal movement of throttle valve lever 84, it will be apparent that throttle valve member 72 is ultimately responsive to the control lever movement which is transmitted to throttle valve lever 72 through abutment shaft 148. Throttle valve member 72 is movable from a closed position in which throttle valve member 72 engages throttle valve seat 76 and a plurality of open positions in which throttle valve member 72 is spaced from throttle valve seat 76 by varying amounts to thereby regulate the throttle passageway flow.

In the operation of the embodiment shown in FIGS. 1 and 2, the temperature adjusting plug 32 is rotated to a desired temperature setting by dial means operation. When the control valve is in the fully closed position as shown in FIG. 2, bellows 38 has expanded to move control lever 120 downwardly to a position wherein throttle lever 84 has been actuated by spring 96 to move throttle valve member 72 to cover throttle valve seat 76. Snap-action mechanism 130 has been actuated to the inactive position thereof whereby spring 106 biases control valve member 100 to the closed position thereof.

As the bulb temperature falls, bellows 38 contracts, allowing control lever 120 to be moved upwardly under the bias of spring 44 acting through cup 46. The upward movement of control lever 120 is transmitted to throttle valve member 72 through abutment shaft 148 and throttle valve lever 84 thereby uncovering throttle valve seat 76. This control lever movement is also transmitted to thrust button 136 through upset dimple 146.

It will be apparent that while this upward movement of control lever 120 will cause a gradual opening of throttle valve member 72, control valve member 100 will remain in the closed position thereof until snap-action mechanism 130 has been moved through the preliminary graduating movement thereof to snap overcenter at which time fulcrum levers 144 actuate control valve member 100 to the open position thereof. This action places the control valve member 100 in the initial open position in which the flow of fluid passes from inlet chamber 26 through both the throttle and auxiliary passageways to outlet chamber 28.

The initial open position of throttle valve member 72 is adjustable by rotation of adjusting screw 156 which determines the position of throttle valve lever 84 with respect to the position of control lever 120 whereby the desired amount of initial flow to throttle valve seat 76 may be set. Initial flow of 50 percent of capacity is considered to be a desirable condition. After the control valve member 100 has been actuated to the initial open position, further contraction of bellows 38 causes additional upward movement of control lever 120. This movement is transmitted to throttle valve member 72 by abutment shaft 148 and throttle valve lever 84 to cause additional upward movement of throttle valve member 72 until the fully open position of the control valve is reached.

Upon a subsequent expansion of bellows 38 in response to an increase in bulb temperature, the control valve member 100 will throttle down from the fully open position as control lever 120 is pivoted downwardly. This results in a corresponding downward movement of throttle valve lever 84 under the bias of spring 96 to cause throttle valve member 72 to cover throttle valve seat 76 and shut off the throttle passageway flow. Throttle valve member 72 will gradually move to the closed position thereof as snap-action mechanism 130 is moved through its return preliminary graduating movement whereby the throttle valve member 72 will shut off the throttle passageway flow before snap-action mechanism 130 snaps overcenter.

With the throttle valve member 72 in the closed position thereof and the control valve member 100 in the open position thereof, the control valve is in a minimum flow position in which the flow of fluid is through the auxiliary passageway as follows: from inlet chamber 26 through bypass passageway 110, L-shaped duct 112, and control valve seat 98 into outlet chamber 28. Further downward movement of control lever 120 at this point will cause snap-action mechanism 130 to snap overcenter to inactive position thereby allowing control valve member 100 to cover the control valve seat 98 placing the control valve member 100 in the fully closed position.

It is to be understood that although only one embodiment of this invention has been shown and described, the invention may be variously embodied and changes may be made in the construction and arrangement of parts without departing from the scope of the invention as defined by the appended claims.

We claim:

1. In a fluid flow control device, the combination comprising a casing having an inlet, an outlet, and a partition therebetween, means defining a first passageway through said partition, a first valve seat formed on a wall of said partition and spaced from said first passageway, a second valve seat formed on said wall of said partition adjacent said first passageway, means defining a second passageway through a wall of said casing and said partition communicating at one end with said inlet and at the other end with the space formed intermediate said first valve seat and said second valve seat, a first valve member movable between a closed and a plurality of open positions relative to said first valve seat for regulating the direct flow of fluid from said inlet through said first passageway, a second valve member movable between a closed position and an open position relative to said second seat for controlling the flow of fluid through said first and second passageways, a control means including a control member movable in response to variations in a controlling condition, a control lever pivotally mounted at one end thereof and operatively connected to said control member at the other end thereof, motion transmitting means operatively connected between said control means and said first valve member for moving the latter from one of said open positions thereof to said closed position thereof in response to a first movement of said control means, overcenter snap-action means operatively connected between said control means and said second valve member for abruptly moving said second control valve between said controlling positions thereof in response to movement of said control means, said snap-action means being positioned for engagement with said control lever, said motion transmitting means including a second lever pivotally mounted at one end thereof and operatively connected to said first valve member at the other end thereof, and shaft means mounted for slidable movement between said control lever and said second lever, said snap-action means being responsive to said first movement of said control means to move through a preliminary graduating movement thereof while maintaining said second valve member in said open position thereof.

2. A device as claimed in claim 1 including means for adjusting the length of said shaft means and wherein said shaft means engages said second lever at a point substantially closer to said pivoted end thereof than to said end operatively connected to said first valve member whereby said shaft means movement is transmitted into a corresponding amplified movement of said first valve member.

3. A device as claimed in claim 2 wherein said second valve seat is formed within said first valve seat in concentric relation thereto and said first valve member is positioned to overlie said second valve member and is constructed to enclose said second valve member and including a resilient means positioned in compression between said first and second valve members for biasing said second valve member towards said second valve seat.

References Cited in the file of this patent

UNITED STATES PATENTS

| | | |
|---|---|---|
| 2,702,052 | Grayson | Feb. 15, 1955 |
| 2,741,266 | Grayson | Apr. 10, 1956 |
| 2,783,946 | Lanskey et al. | Mar. 5, 1957 |
| 2,814,447 | Greenamyer | Nov. 26, 1957 |
| 2,831,504 | Coffey | Apr. 22, 1958 |